United States Patent [19]

Dirven et al.

[11] Patent Number: 5,639,516

[45] Date of Patent: Jun. 17, 1997

[54] METHOD FOR MAKING A GAS DIFFUSION ELECTRODE

[75] Inventors: Paul Dirven, Westerlo; Willy Engelen, Balen, both of Belgium

[73] Assignee: Vlaamse Instelling Voor Technologisch Onderzoek, Belgium

[21] Appl. No.: 465,111

[22] Filed: Jun. 5, 1995

[30] Foreign Application Priority Data

Jun. 7, 1994 [BE] Belgium ................. 09400562

[51] Int. Cl.$^6$ ................................. B05D 7/00
[52] U.S. Cl. ................. 427/421; 427/115; 427/424
[58] Field of Search ................. 427/421, 424, 427/115; 429/41, 42

[56] References Cited

U.S. PATENT DOCUMENTS

| | | |
|---|---|---|
| 4,185,131 | 1/1980 | Goller et al. . |
| 4,804,592 | 2/1989 | Vanderborgh et al. . |
| 4,849,253 | 7/1989 | Maricle et al. . |
| 5,234,777 | 8/1993 | Wilson ........................... 427/115 |

FOREIGN PATENT DOCUMENTS

| | | |
|---|---|---|
| 0 046 086 | 8/1981 | European Pat. Off. . |
| 46086 | 2/1982 | European Pat. Off. . |
| 1.424.432 | 9/1966 | France . |
| 1.604.645 | 1/1972 | France . |
| 2.090.075 | 1/1972 | France . |
| 1604645 | 2/1972 | France . |
| 2.171.092 | 9/1973 | France . |

OTHER PUBLICATIONS

*Database WPI*, Section Ch., Derwent Publication Ltd., Great Britain. No Date Available.

"Manufacture of Electrode for Fuel Cell" (S. Akitoshi), *Patent Abstracts of Japan*, vol. 16 No. 144 (May 27, 1992).

*Primary Examiner*—Shrive Beck
*Assistant Examiner*—David M. Maiorana
*Attorney, Agent, or Firm*—Bacon & Thomas

[57] ABSTRACT

Method for making a gas diffusion electrode, whereby at least one layer of a liquid (7) containing active particles and a binding agent in a solvent is sprinkled or atomized on a porous, hydrophobic support (8), characterized in that the sprinkling or atomization is carried out by adding heat to the sprinkled or atomized liquid, so that the solvent is partly evaporated before the support (8) is reached.

10 Claims, 1 Drawing Sheet

METHOD FOR MAKING A GAS DIFFUSION ELECTRODE

Method for making a gas diffusion electrode, whereby at least one layer of a liquid containing active particles and a binding agent in a solvent is sprinkled or atomized on a porous, hydrophobic support.

Such methods are applied for making electrodes for electrochemical cells such as fuel cells, whereby the layer is a catalytic layer and the active particles are catalyst particles.

In the same way can also be provided an intermediate layer between the support and the catalytic layer, in which case the active particles are electron conductive particles.

In "Nouveau type d'électrodes pour piles à combustible hydrogène/oxygène" of S. Escribano, R. Mosdale and P. Aldebert, introduced at the symposium "Réalités et Perspectives du Véhicule Electrique" in La Rochelle (France) of 15–19 November 1993, such a method is mentioned whereby, on a support of porous carbon, a solution of an electron conductor and PTFE is atomized first, and subsequently a solution of a catalyst, an electron conductor and PTFE. In between atomizations, the solvent is evaporated. Afterwards, a layer of NAFION® is atomized on the whole.

Besides, the sprinkling or atomizing of a solution or suspension of solid particles on a support is a conventional technology. It allows to apply thin and relatively homogenous layers.

The evaporation of the solution after the sprinkling or atomization usually takes place in the air, but it can be speeded up by heating, for example by putting the support with the provided layer in an oven and by heating it.

The problem with these known methods is to simultaneously obtain the required porosity and firmness of the layer provided on the support.

SUMMARY OF THE INVENTION

The invention aims to remedy this problem and to provide a method for making a gas diffusion electrode which makes it possible to provide a layer on a support which is porous and whose particles are firmly bound to one another.

To this aim, the sprinkling or atomization is carried out by adding heat to the sprinkled or atomized liquid, so that the solvent is partly evaporated before the support is reached.

In fact, a sort of spray-drying is to a certain degree obtained in this way.

By partly evaporating the solution, the active particles are surrounded by a film of the binding agent before they reach the support. These coated particles are put against one another as individual granules and, as the binding agent has not dried entirely yet, are glued together by this binding agent. In this manner, the active particles are homogeneously distributed and evenly surrounded by the binding agent.

The heat supply can be obtained by sprinkling or atomizing in a hot environment or by directly heating the sprinkled or atomized liquid, for example by means of infrared rays.

In a practical embodiment of the invention, a liquid is sprinkled or atomized which has catalyst particles as active particles.

For many applications, platinum is the most suited catalyst, and the catalyst particles are platinized carbon particles.

According to another practical embodiment of the invention, a liquid is sprinkled or atomized with an ionomer as a binding agent.

It was found that for electrodes, the use of an ionomer instead of a binding agent such as PTFE provides a better result.

A suited ionomer is NAFION®, which is a perfluoric sulphonic acid commercialized by Du Pont de Nemours.

The support can be either or not permanent. In case the support is permanently part of the electrode, it is of course porous and hydrophobic. A suited support is a support obtained by applying a paste of electrically conductive material, in particular carbon and a binding agent, in particular PTFE, on a fabric such as a carbon fabric.

Other particularities and advantages of the invention will become clear from the following description of a method for making a gas diffusion electrode according to the invention. This description is given as an example only and does not restrict the invention in any way.

BRIEF DESCRIPTION OF THE DRAWINGS

The figures refer to the accompanying drawings, in which.

DETAILED DESCRIPTION OF THE INVENTION

The figures represent a device with which a catalyst layer can be provided on a support to make an electrode according to the invention.

Figure 1:
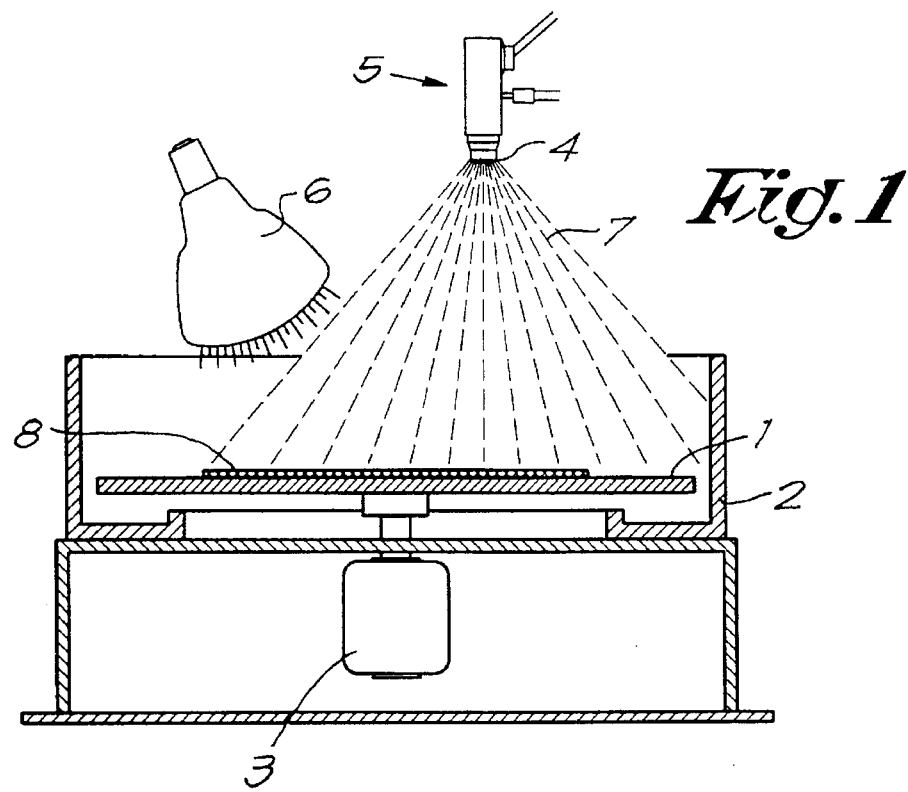
FIG. 1 shows a device with which the method according to the invention is applied.

According to FIG. 1, this device contains a rotating table 1 which is mounted on the frame 2 and is driven by an electric motor 3. Above the table 1, but eccentrically in relation to the axis of rotation, is situated the sprinkler head 4 of a device 5 for sprinkling or atomizing, which is mounted on the frame 2. This device 5 can be of a know construction and is not described in detail here.

What is important is that, next to the sprinkler head 4, is mounted an infrared lamp 6 which directs infrared rays to the sprinkled liquid.

This liquid is a suspension of ink 7 which consists of active particles mixed with a binding agent, in particular an ionomer, in a solvent.

To make an electrode, one proceeds as follows:

A support 8 is placed on the table 1. If it is permanently part of the electrode, this support must also be porous and electrically conductive. A suited support is a support consisting of a carbon fabric upon which was provided a mixture of carbon and a binding agent such as PTFE and then dried.

Subsequently, the above-mentioned ink 7 is sprinkled on said support while the infrared lamp 6 is working. Due to the heat of this lamp, the solvent in the small liquid drops will partly evaporate before these drops reach the support 8.

As a result, granules of active particles are formed even in the air, surrounded by a binding agent which has not entirely dried yet, and a granular, porous layer is obtained on the support 8 in which the granules firmly stick together due to the binding agent. The binding agent and active particles are evenly distributed and all active particles are surrounded by a binding agent, so that, after further drying, a very firm, porous layer is obtained.

This method is particularly suited for making a catalyst layer whereby the active particles are catalyst particles, for example platinized carbon, and the binding agent is preferably an ionomer. This layer can be sprinkled in one or several stages, whereby a further evaporation of the solvent is possible in between said stages. The layer can have a thickness of a few micrometers, and the amount of catalyst can be situated between 0.10 and 0.50 mg Pt/cm$^2$. In case platinized carbon is used as catalyst particles, these particles can contain for example 10 to 40 percentage by weight of platinum.

In an analogous manner can also be made a conductive noncatalytic intermediate layer whereby the active particles are electron conductive particles, such as carbon particles, instead of catalyst particles, and the binding agent is preferably also an ionomer. Also this layer, which was sprinkled in one or several stages, can be a few micrometers thick.

Figure 2:
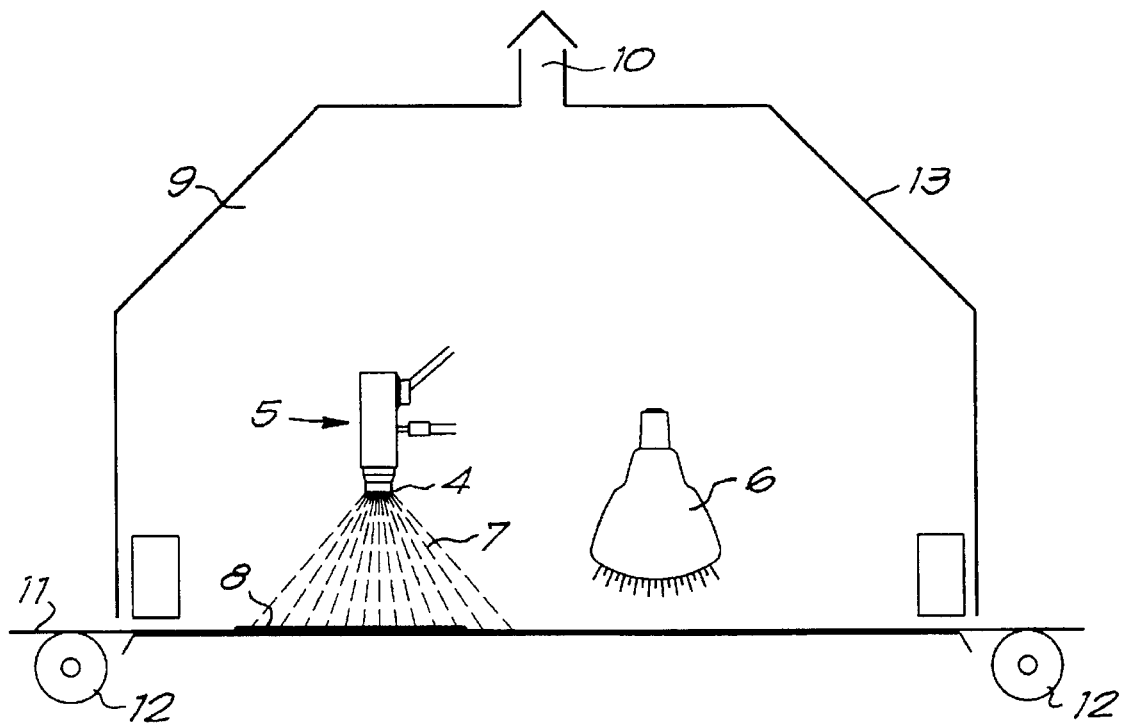
FIG. 2 shows a device analogous to that in FIG. 1, but with which can be carried out another embodiment of the method according to the invention.

The device represented in FIG. 2 makes it possible to apply the same principle, whereby the solution partly evaporates before the ink 7 reaches the support 8, but the evaporation is not caused by direct radiation of an infrared lamp 6, but because the sprinkling takes place in a closed, heated environment or space 9 from which the solvent vapours are extracted via a duct 10.

Also in this device is provided a stationary mounted sprinkler device 4 in the above-mentioned space 9, above a heated endless belt 11 which is moved over rollers 12 and upon which the support 8 is placed. The space 9 is confined by the endless belt 11 and a cap 13 mounted above it to the top of which the duct 10 is connected. The space 9 is heated by means of hot air or by means of an infrared lamp 6 mounted in it, whereby the heating of the endless belt 11 also contributes to this heating.

In both embodiments, the evaporation of the solvent depends on the intensity of the heating which can be set such that, for a given binding agent, the optimal grain formation and adhesive power between the granules is obtained.

The obtained porous gas diffusion electrodes which are made in this way are very homogenous and have excellent mechanical and electrochemical qualities. This method is particularly suited for making electrodes, in particular cathodes for fuel cells, whereby for example a noncatalytic intermediate layer is provided on a porous support with a catalyst layer on top of it.

Above the rotating table 1 of the endless belt 11 can be provided several sprinkler devices 5, so that several identical or different layers can be sprinkled one after the other.

We claim:

1. Method for making a gas diffusion electrode, whereby at least one layer of a liquid containing active particles and a binding agent in a solvent is sprinkled or atomized on a porous, hydrophobic support, characterized in that the sprinkling or atomization is carried out by adding heat to the sprinkled or atomized liquid, so that the solvent is partly evaporated before the support is reached and as a result of said evaporation, said active particles contained in said solvent become surrounded with a film of binding agent before said active particles reach said support.

2. Method according to claim 1, characterized in that heat is supplied to the sprinkled or atomized liquid by sprinkling or atomizing in a hot environment.

3. Method according to claim 1, characterized in that heat is supplied to the sprinkled or atomized liquid by directly directing heat to the sprinkled or atomized liquid.

4. Method according to claim 1, wherein heat is supplied by means of infrared rays.

5. Method according to claim 1, wherein a liquid is sprinkled or atomized with catalyst particles as active particles.

6. Method according to claim 5, characterized in that a liquid is sprinkled or atomized with platinized carbon particles as catalyst particles.

7. Method according to claim 1, wherein a liquid is sprinkled or atomized with an ionomer as a binding agent.

8. Method according to claim 1, wherein the sprinkling or atomization is carried out on a support obtained by means of a paste of electrically conductive material and a binding agent on a fabric.

9. Method according to claim 8, characterized in that the sprinkling or atomization is carried out on a support consisting of a carbon fabric and a mixture of carbon and PTFE provided upon it.

10. Method according to claim 1, wherein the sprinkling or atomization is carried out with a device while the support is moved by means of a mobile support.

* * * * *